Dec. 29, 1953     A. BECHLER     2,664,032
AUTOMATIC PINION CUTTING MACHINE
Filed April 4, 1951     3 Sheets-Sheet 1

INVENTOR
ANDRÉ BECHLER.
by K. A. Mayr
ATTORNEY

Dec. 29, 1953 A. BECHLER 2,664,032
AUTOMATIC PINION CUTTING MACHINE
Filed April 4, 1951 3 Sheets-Sheet 2

INVENTOR
ANDRÉ BECHLER.
by K. H. Mayr
ATTORNEY

Dec. 29, 1953  A. BECHLER  2,664,032
AUTOMATIC PINION CUTTING MACHINE
Filed April 4, 1951  3 Sheets-Sheet 3

INVENTOR.
ANDRÉ BECHLER
ATTORNEY.

Patented Dec. 29, 1953

2,664,032

UNITED STATES PATENT OFFICE 2,664,032

AUTOMATIC PINION CUTTING MACHINE

André Bechler, Moutier, Switzerland

Application April 4, 1951, Serial No. 219,156

Claims priority, application Switzerland April 15, 1950

2 Claims. (Cl. 90—9)

The present invention relates to a machine tool and more particularly to a machine for cutting pinions for watch movements and the like mechanisms. Still more particularly it relates to an automatic pinion cutting machine having an apparatus for feeding the work pieces to the machine proper.

Machines of this kind are well known in the prior art with which I am familiar. They have the disadvantage that the work feeding apparatus is arranged beside the cutting machine proper and causes a serious loss of space or area available in the work-shop for setting up a number of such machines. Accordingly it is the main object of this invention to do away with this disadvantage of the known machines.

Another object of my invention is to provide a wholly automatic pinion cutting machine which is cheap in construction and which can easily be mounted and dismounted.

Still other objects will appear in the following description of a preferred embodiment of the pinion cutting machine of my invention.

In the drawings.

In the drawings certain parts have not been shown in some figures and certain other parts have been omitted in some other figures, to avoid confusion. Like parts are designated by the same reference numerals in all figures of the drawing.

Figure 3:
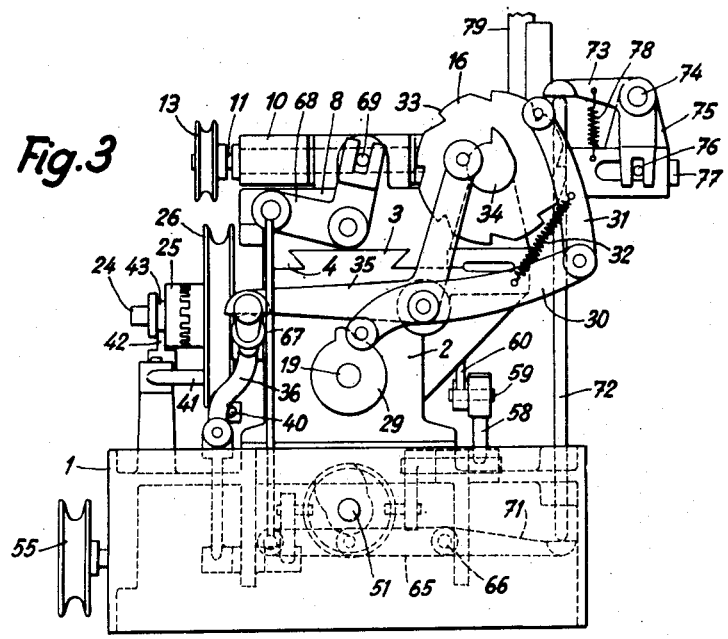
Fig. 3 is a side view of the indexing device and of certain other control devices forming part of the machine.
Figure 4:
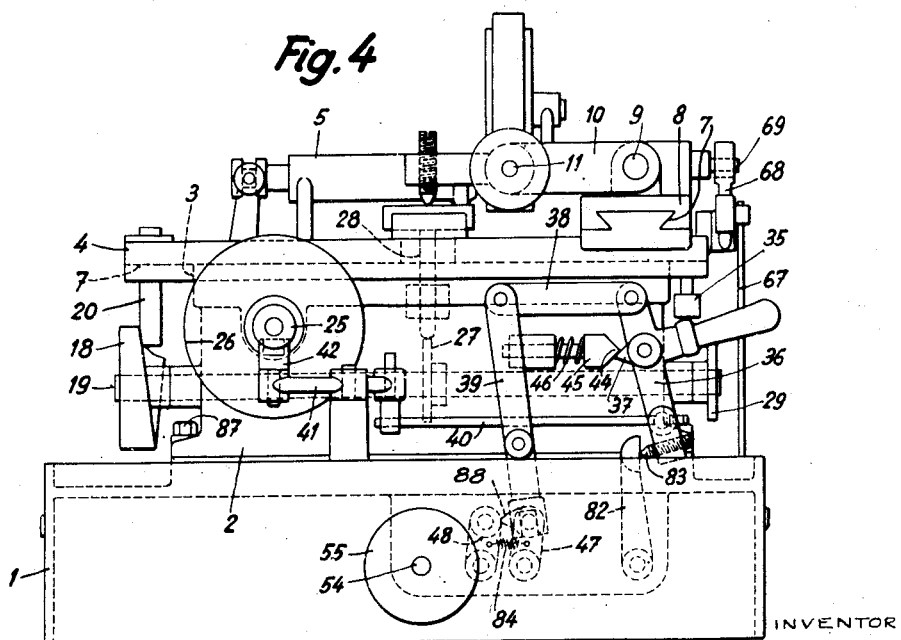
Fig. 4 is a rear elevational view of the machine.

The pinion cutting machine represented in the drawings comprises a work feeding apparatus the casing 1 of which is constituted by a partitioned frame sufficiently stiff to support a casing 2 which is that of the pinion cutting machine proper. Casing 2 is provided with a longitudinally extending guideway 3 (Fig. 3) for a longitudinal slide 4 supporting a bearing or tailstock 5 and having formed on it a guideway 7 (Fig. 4) extending transversally to the guideway 3. An axle or spindle 6 having a dead centre is mounted for axial sliding movement in a bore of the tailstock 5. The guideway 7 is for a transversal slide 8 fitted with a horizontal, transversally extending axle 9 for a swinging support 10. A tool spindle 11 is rotatably mounted in the free end of this swinging support 10. It carries at one end a gear milling cutter 12 and at its other end a pulley 13 forming part of means for driving, i. e. rotating, the gear cutter.

A support 14 fixedly mounted on casing 2 constitutes a bearing for a shaft 15 carrying at one end a disc 16 for indexing the work piece 17 mounted on centres between this shaft 15 and the tailstock spindle 6.

The arrangement of the several control mechanisms forming part of the pinion cutting machine proper and of the work feeding apparatus will now be described and the operation of these mechanisms will be explained at the same time.

In the drawings, the automatic pinion cutting machine is represented in its working state. The advance of the rotating cutter 12 is obtained by longitudinally moving the slide 4 by means of a bell-shaped cam 18 rigidly mounted on a horizontal, longitudinally extending camshaft 19 rotatably mounted in casing 2. The bell-shaped cam 18 acts upon a finger 20 fixed to the slide 4. A tension spring 21 attached to this slide 4 and to the casing 2 affords continuous engagement of the finger 20 with the control surface of the bell-shaped cam 18. Hence, the latter controls the advance as well as the return movement of the cutter 12.

The means for rotating the camshaft 19 comprise a worm gearing 22, 23. The worm 22 is rigidly connected, or made in one piece, with a transversally extending shaft 24. A claw clutch is provided having its driven part 25 slidably keyed to one end of shaft 24, whilst the driving part is loosely mounted on this shaft and made in one piece with a pulley 26 of a belt drive.

When the cutter 12 has reached the end of its cutting stroke, the finger 20 engages the highest point of the control surface of the bell-shaped cam 18 and a cam disc 27 fixed to camshaft 19 lifts the swinging support 10 together with the cutter 12 by means of a rod 28. When the cutter 12 is lifted, the finger 20 slides along the descending portion of the cam 18 and the spring 21 returns the slide 4 together with the transversal slide 8, the swinging support 10 and the cutter 12 to the initial postion for starting another cutting stroke. When this initial position is reached, the rod 28 engages a descending portion of cam disc 27 and the swinging support 10 is lowered together with the cutter 12 so that the latter is ready to begin the following cutting stroke. During this return stroke of the cutter 12 a cam 29 on camshaft 19 produces indexing of the work piece 17. To this end, the cam 29 acts upon a cam lever 30 carrying a pawl 31 which engages the toothed periphery 33 of the indexing disc 16 due to the action of a tension spring 32 attached to the pawl and to the cam lever 30. The finger 20 now engages the ascending portion of the bell-shaped cam 18 and cutting of another indentation in the work piece 17 is thus started.

When all indentations are cut in the work piece 17 and when cam disc 29 acts once more to index the work piece by means of members 30, 31 and 16, a cam disc 34 rigidly connected, or made in one piece, with the indexing disc 16 rocks a lever 35. This lever acts upon a hand lever 36 having a wedge portion 37. Hand lever 36 is connected with a lever 39 by means of a link 38 and with one arm of a bell crank 41 by means of a rod 40. The other arm of the bell crank 41 is fitted with a finger 42 engaging a peripherical groove 43 of clutch member 25.

Figure 5:
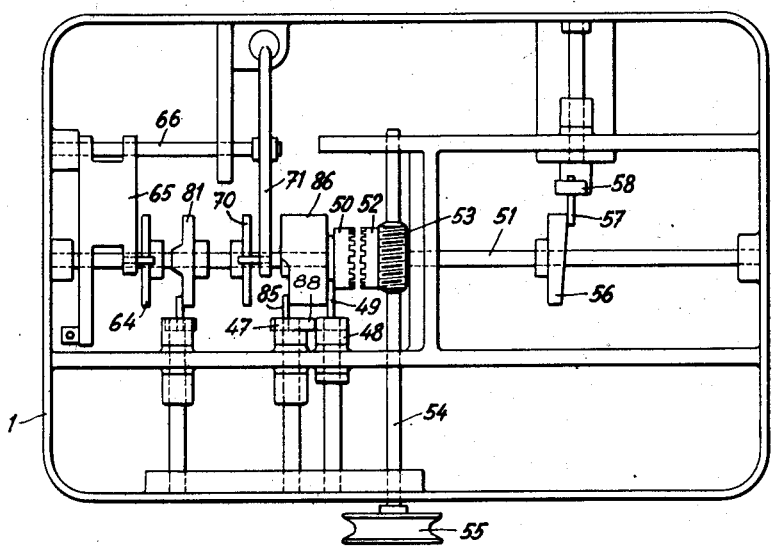
Fig. 5 shows the work feeding apparatus as seen from below.
Figure 6:
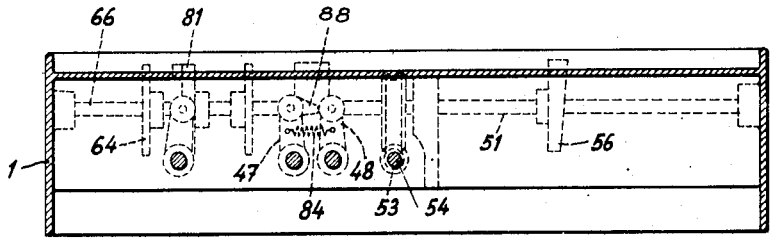
Fig. 6 is an elevational, partly sectional view of the work feeding apparatus.

The wedge portion 37 cooperates with a wedge 44 facing the wedge 37 and having a trunk 45 engaged by a compression spring 46. This arrangement causes the levers 36, 39 and 41 to be rocked to the end position opposite to that shown in Fig. 4 when the hand lever has passed the dead centre position in which the edges of the wedges on lever 36 and on the trunk 45 engage each other thereupon the bell crank 41 disengages the claw clutch 24, 25 and at the same time a finger 88 provided on a lever 47 movably connected to the lever 39 acts upon a lever 48. One arm of this lever is provided with a finger 49 (Fig. 5) engaging an annular groove of the driven part 50 of a claw clutch, this driven part being axially slidably keyed on a camshaft 51 forming part of the work feeding apparatus. When the lever 48 is rocked as mentioned hereabove, the clutch part 50 engages a counterpart 52 which is loosely mounted on camshaft 51 and made in one piece with a worm gear engaging a worm 53. This worm is fixed on, or made in one piece with a transversally extending drive shaft 54 rotatably mounted on casing 1 and rotated by means of a belt drive comprising the pulley 55 fixed to one end of the shaft 54. The camshaft 51 is rotated when clutch 50, 52 is engaged.

Figure 1:
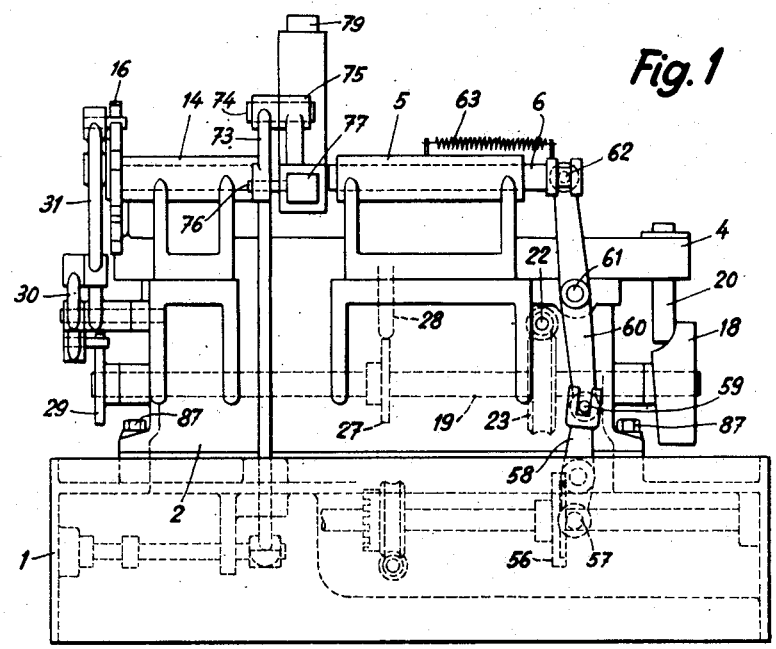
Fig. 1 is a front elevational view of the pinion cutting machine.
Figure 2:
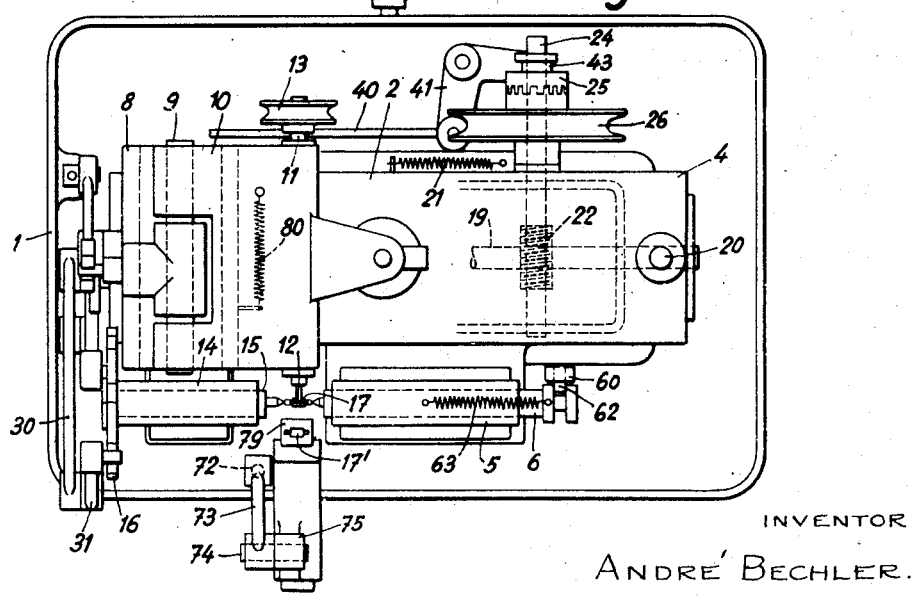
Fig. 2 is a plan view thereof.

The camshaft 51 of the work feeding apparatus is fitted with a bell-shaped cam 56 adapted for cooperation with a finger 57 fixed to one arm of a lever 58 the other, forked arm of which is engaged by a finger 59 (Figs. 1 and 3) fixed to one end of a lever 60. This lever is pivoted on casing 2 at 61. Its other end is provided with a finger 62 engaging an annular groove provided at the rear end of the tailstock spindle 6. When camshaft 51 starts rotating, the cam 56 moves this tailstock spindle 6 rearwardly (towards the right in Fig. 1) by means of the just described lever assembly and against the action of a tension spring 63 attached to the tailstock 5. On being retracted, the tailstock spindle leaves the work piece 17 which thus is allowed to fall into a box not shown. At the same time a cam disc 64 also fixed to camshaft 51 rocks a cam lever 65 pivoted on an axle 66 and connected to a bell crank 68 by means of a rod 67. The bell crank 68 has a forked arm which is engaged by a pin 69 fixed to the transversal slide 8. Hence, this slide 8 and the swinging support 10 are moved together with the cutter 12 which is thus carried away from its working plane. Thereafter a cam disc 70 also fixed to camshaft 51 acts upon a cam lever 71 mounted on the axle 66 at one side of cam lever 65. On being rocked, cam lever 71 acts upon a rod 72 which in turn acts upon a bell crank 73 pivoted at 74 on a fixed part 75 of the machine and provided with a forked end which is engaged by a pin 76 fixed to a feeder member or ram 77 mounted for sliding movement in a horizontal, transversal direction. This feeder member 77 thereby brings another blank or work piece 17 to the vertical work plane extending through the axes of the work-piece supporting members 6 and 15. When the blank has reached this position, the cam follower roller on the lever 71 engages the circular outer portion of cam 70, maintaining the position of the feeder 77. Thereupon, the finger 57 glides over the descending portion of the bell-shaped cam 56 and permits the spring 63 to bring the tailstock spindle 6 back to a position in which it engages the newly fed work piece 17 which is then held between centres and occupies what may be called the work station. Thereupon the cam 70 is disengaged from the cam lever 71 and feeder 77 returns to its initial or rest position owing to the action of a spring 78. When this position is reached, another blank or work piece 17' is permitted to fall from the magazine 79 fixed to casing 2, into a recess provided at the fore-end of the feeder 77. At the same time cam 64 disengages from lever 65, permitting a spring 80 to bring the transversal slide 8, the swinging support 10 and the cutter 12 to their respective initial position. Immediately afterwards a bell-shaped cam 81 fixed to camshaft 51 acts upon a lever 82, rocking it in clockwise direction in Fig. 4. This lever acts upon the hand lever 36 by means of a set screw 83 adjustably fixed to the latter. As soon as hand lever 36 has travelled slightly over its dead centre position, it is caused to continue this movement, owing to the already described action of the wedges 37 and 44 and of spring 46. This movement of the hand lever 36 causes the actuation of the clutch 25, 26 by means of the rod 40, of the bell crank 41 and of finger 42 engaging the groove of clutch part 25. Hence, the camshaft 19 starts rotating. The movement of hand lever 36 also causes a rocking movement of lever 47 through the link 38 and the lever 39. However, the rocking of lever 47 is not obtained in a positive manner, because lever 47, operatively connected to lever 48 by means of finger 88 and of a spring 84, is yieldingly connected to lever 39. At first, a finger 85 provided on lever 47 engages a lobe of a bell-shaped cam 86 fixed on camshaft 51. When the shaft 51 and cam 86 have rotated through a further fraction of one revolution, the finger 85 sliding over the descending portion of cam 86, the levers 47 and 48 can follow the movement of lever 39. Thereupon finger 49 disengages the clutch part 50 from the driving clutch part 52 in order to stop the camshaft 51 of the work feeding apparatus after it has made one revolution. As has already been mentioned, the camshaft 19 has already started rotating and controls the cutting operations. Camshaft 19 rotating and camshaft 51 being stopped, the working cycle is completed and another cycle is started.

As is clearly shown in the drawings, certain of the longitudinally and transversely extending partition walls of the frame constituting the casing 1 of the work feeding apparatus are adapted as bearings for revolving parts such as the rotary camshaft 51 and the pivoting axle 66 of the work feeding apparatus. This arrangement facilitates mounting and dismounting of the machine, because casing 2 and the parts mounted thereon may be removed by merely unscrewing a few screws 87 which are used to normally fix casing 2 to casing 1.

It should be noted that the representation is a rather diagrammatic one and that various changes of the shape and arrangement of the parts could be resorted to without departing from the scope or spirit of the invention.

I claim:

1. An automatic pinion cutting machine comprising in combination, a first casing, means mounted on said first casing for supporting a work piece at a work station, rotary tool supporting means movably mounted on said first casing for performing advance and return movements of the tool relatively to said work piece supporting means, a first camshaft mounted on said first casing, indexing means comprising a cam on said first camshaft for indexing the work piece, mechanisms comprising further cams on said first camshaft for effecting advance and return movements of said tool supporting means, a second casing disposed beneath said first casing and removably connected thereto, a second camshaft rotatably mounted on said second casing and arranged beneath said first camshaft, an actuating mechanism including a cam on said second camshaft for actuating said work piece supporting means for releasing a workpiece and for subsequently engaging another work piece, a magazine fixed to said first casing and adapted to hold a plurality of work piece blanks, a work piece feeder mechanism connected with for timing by said actuating mechanism and including a cam on said second camshaft; first drive means for driving said first camshaft, said first drive means comprising a first clutch, second drive means for driving said second camshaft, said second drive means comprising a second clutch, clutch actuating means comprising a cam connected with said indexing means for engaging said second clutch and subsequently releasing said first clutch when the work piece has been indexed through one complete revolution and comprising cam means on said second camshaft, for engaging said first clutch and releasing said second clutch when said second camshaft has made one revolution.

2. An automatic pinion cutting machine comprising in combination, means for supporting a work piece at a work station, movable rotary tool supporting means mounted on said first casing for performing advance and return movements of the tool relatively to said work piece supporting means, a first camshaft, indexing means comprising a cam on said first camshaft for indexing the work piece, mechanisms comprising further cams on said first camshaft for effecting advance and return movements of said tool supporting means, a second camshaft arranged beneath said first camshaft, an actuating mechanism including a cam on said second camshaft for actuating said work piece supporting means for releasing a work piece and for subsequently engaging another work piece, a magazine adapted to hold a plurality of work piece blanks, a work piece feeder mechanism connected with for timing by said actuating mechanism and including a cam on said second camshaft; first drive means for driving said first camshaft, said first drive means comprising a first clutch, second drive means for driving said second camshaft, said second drive means comprising a second clutch, clutch actuating means comprising a cam connected with said indexing means for engaging said second clutch and subsequently releasing said first clutch when the work piece has been indexed through one complete revolution and comprising cam means on said second camshaft, for engaging said first clutch and releasing said second clutch when said second camshaft has made one revolution.

ANDRÉ BECHLER.

References Cited in the file of this patent
UNITED STATES PATENTS

| Number | Name | Date |
|---|---|---|
| 380,499 | Leman | Apr. 3, 1888 |
| 432,791 | Church | July 22, 1890 |
| 476,953 | Church | June 14, 1892 |
| 485,410 | Gill | Nov. 1, 1892 |
| 2,365,746 | Connell | Dec. 26, 1944 |